United States Patent Office 3,344,220
Patented Sept. 26, 1967

3,344,220
PROCESS OF MAKING A HEARING AID HAVING A FOAMED SUPPORTIVE STRUCTURE FORMED IN SITU
Galen B. Cook, Columbia, Mo. 65201
No Drawing. Filed Apr. 4, 1966, Ser. No. 539,733
1 Claim. (Cl. 264—222)

This application is a continuation-in-part of application Serial No. 113,413, filed May 29, 1961 and now U.S. Patent Number 3,247,841 and of application Serial No. 466,703, filed June 24, 1965 and now U.S. Patent Number 3,313,292. This invention relates to the provision of obstructive and supportive structures for cavities of a human being.

There has been a long felt need for a simple, effective, inexpensive, quick, and painless method for providing obstructive and supportive structures in passages in the human body. For example, the present method of making hearing aids of the type in which a speaker is mounted on an earpiece which projects in part into the concha and mouth of the ear canal, involves taking a plaster or other hard mold in the doctor's office, sending the mold to a laboratory where a plastic holder is made and sent back for final fitting. The process frequently takes about three weeks, and is uncomfortable.

One of the objects of this invention is to provide a method for providing obstructive and supportive structures, which method is easy to perform, quick, simple, inexpensive, relatively painless, and effective.

Other objects will become apparent to those skilled in the art in the light of the following description.

In accordance with this invention, generally stated, a method of impacting in a human being is provided which comprises introducing into a cavity to be impacted a liquid elastomeric material, a setting agent in the presence of which the liquid elastomeric material sets at or below body temperature to a surface-conforming, coherent, unplastic, pliant solid, and an intumescent; thereupon causing the elastomeric material to intumesce, and setting the intumesced elastomeric material in situ while maintaining the material in intimate contact with walls defining the cavity.

In applying the method to the manufacture of fitted hearing aids, the amount of intumescent material may be minimal, although it is preferred to use enough intumescent to produce a spongy matrix structure. The resulting structure is not only comfortable in place but screens background noise.

Elastomeric materials, setting agents, and intumescents may be those set forth in the examples in the parent applications, the earlier of which will be U.S. Patent No. 3,247,841, dated April 26, 1966. For most of the applications of the method, it will not be necessary to include a radiopaque material, although, for some purposes, particularly when the material is used as a tamponade, it may be desirable to have such a component. Accordingly, in the following examples, the radiopaque material can be included or omitted as the application requires.

EXAMPLE 1

Parts by weight

Room temperature vulcanizing silicone rubber (Silastic RTV 502), a liquid prepolymer dimethyl silicone, about 45,000 cs. _____ 30
Silicone rubber foam (Silastic Q-3-0030), intumescent, about 5,000 cs. _____ 30
Cyclic dimethyl polysiloxane (silicone fluid), 20 cs. _ 40

Parts by weight

Stannous octoate (catalyst) _____ 2
Diatrizoate sodium (in 20 parts water), radiopaque material _____ 25

The viscosity of the material, immediately after the catalyst is added, and before setting begins appreciably, is less than 6,000 centistokes.

In using the composition of Example 1, the catalyst is added immediately before the material is used. The material can be put into a flexible, liquid impervious bag and mixed. The steps which follow, depend upon the application of the material, and will be described as applicable to all of the compsitions.

EXAMPLE 2

Parts by weight

Room temperature vulcanizing silicone rubber (Silastic RTV 502), a liquid prepolymer dimethyl silicone, about 45,000 cs. _____ 50
Silicone rubber foam (Silastic Q-3-0030), intumescent, about 5,000 cs. _____ 50
Cyclic dimethyl polysiloxane (silicone fluid), 20 cs. _ 2
Diatrizoate sodium (in 20 parts water), radiopaque material _____ 25

The viscosity of the material, immediately after the catalyst is added, and before setting begins appreciably, is less than 6,000 centistokes.

EXAMPLE 3

The following ranges of the silicone ingredients of Example 1 and 2 have been found operative. Other proportions may be useful, but have not been actually tried.

Parts by weight

Silastic RTV 502 _____ 10–40
Silastic Q-3-0030 _____ 70–30
Silicone fluid _____ 5–40

In any of Examples 1, 2 and 3, other room temperature vulcanizing (RTV) silicone rubbers and silicone fluids may be used. The "Silastic" products are obtainable from Dow Corning Corporation. Operative RTV silicone rubber corresponding to Silastic RTV 502 and Q-3-0030 are obtainable from General Electric, designated RTV 11 and RTV 40, and RTV 120 and RTV 160 respectively. These latter are also curable with stannous octoate. Other metal soap catalysts, such as tin dilaurate, iron octoate, and chromium octoate may be used, but they are slower acting, hence not as satisfactory for the purpose in this respect.

EXAMPLE 4

Parts by weight

Polysulfide liquid polymer Thiokol LP-2 (Thiokol Chemical Corporation) _____ 70
Dipolymer oil (plasicizer, thinning agent) _____ 10
Cumene hydro peroxide (70%) _____ 8
3-diethylaminopropylamine _____ 2

The polysulfide liquid polymers (polymers of bis (ethylene oxy) methane containing disulfide linkages) show promise as useful compounds for the method of this invention. They set at room temperature, and admit of the use of numerous curing agents, activators and plasticizers (cf. Bulletin entitled "LP-2 Polysulfide Liquid Polymer," of Thiokol Chemical Corporation, id. 1–61H).

EXAMPLE 5

(A)

| | Mols |
|---|---|
| Adipic acid | 16 |
| Diethylene glycol | 16 |
| Trimethyl propane | 1 |

(B)

Tolylene diisocyanate (C)

| | Parts by weight |
|---|---|
| Adipic acid ester of N-diethylaminoethanol | 3 |
| Ammonium oleate | 1 |
| Sulfonated castor oil | 1.5 |
| Water | 1.5 |
| Paraffin oil | 0.5 |

100 parts, by volume, of A, 47 parts, by volume, of B and 10 parts, by volume, of C, are mechanically stirred or mixed in a flexible bag, and the mixture quickly introduced into the cavity in which it is to be applied. This produces a flexible foamed polyurethane structure. For a less dense material, less diisocyanate is used. Such foamed polyurethanes show great promise in vitro. They have not been tested in vivo.

In making a fitted hearing aid, the auditory canal is closed at the desired depth with cotton or other suitable damming material, the composition of any of the examples is mixed and either put in the concha and mouth of the canal without the speaker or else the speaker may be put in place and the composition poured around it. The composition may be made to fill the fossa of the antihelix as well, if it is so desired. When, in a few minutes, the composition has set, it may be removed and trimmed. The dam is removed from the auditory canal. If the speaker has not been cast in the structure, a cavity is made in which the speaker is mounted. The device is then ready for use. The entire process takes about fifteen minutes as compared with three weeks for conventional processes.

The use of the viscosity reducing ingredient is a matter of ease of insertion of the liquid, the pliability of the set material being substantially unaffected thereby. It may be desirable in some applications, such as that of the hearing aid method, to reduce the amount of viscosity-reducing ingredient, to increase the viscosity, since the material can simply be poured into the "cavity" if the person being fitted turns his ear upright.

The terms "fluent," "coherent," "unplastic," "pliant," "intumesce" or "intumescent," "physiologically tolerable temperature" and "nontoxic" have been used in the specification and claim in the following senses: "fluent" is used to mean flowable sufficiently to be introduced rapidly and atraumatically into the cavity to be impacted; "coherent" is used to mean that the molded shape hangs together sufficiently to be removed intact, or, in extreme constrictive cases, in large sections; "unplastic" is used to mean that the set material is not subject to permanent deformation under the forces applied in the use or removal of the shape; "pliant" is used to mean sufficiently soft to permit atraumatic removal of the molded shape; "physiologically tolerable temperature" is used to indicate a range of temperatures from slightly above to substantially below body temperature, at which no damage is done to healthy tissue, and "intumesce" is used to mean to swell, preferably by bubbling, to form a soft but snug-fitting shape. "Instumescent" is used to mean the swelling agent or the characteristic of swelling. "Nontoxic" is used to mean that the material (both fluent and set) is substantially harmless as employed in the method of this invention for the duration of time required. Thus, for example, certain of the ingredients per se may be toxic, but used in the particular cavity, in the concentrations and for the limited time required, have no substantial toxic effect.

Having thus describe the invention, what is claimed and desired to be secured by Letters Patent is:

A method of making a fitted hearing aid for an individual person comprising introducing into the mouth of the ear canal a dam and thereafter into the concha and mouth of the air canal of said person a nontoxic, fluent mixture of a setting agent, a liquid elastomeric material which sets in the presence of said setting agent at a physiologically tolerable temperature to a surface conforming, coherent, unplastic, pliant solid and an intumescent causing said elastomeric material to intumesce; setting said intumesced material in situ while maintaining said material in intimate contact with the concha and mouth of the ear canal, and seating a speaker in said material.

References Cited

UNITED STATES PATENTS

| 2,910,980 | 11/1959 | Stewart | 128—152 |
| 3,080,011 | 3/1963 | Henderson | 128—151 |
| 3,097,059 | 7/1963 | Hoffman | 181—23 |
| 3,220,960 | 11/1965 | Wichterle et al. | 128—2 X |
| 3,247,841 | 4/1966 | Cook | 128—2 |

OTHER REFERENCES

The American Journal of Roentgenology, volume 84, Number 4, April 1962, "The Use of Silicone Foam . . .," Cook et al., pages 633–643.

The Bulletin, volume 3, Number 1, page 4, January 1961, Dow Corning Center for Aid to Medical Research.

RICHARD A. GAUDET, *Primary Examiner.*

C. F. ROSENBAUM, *Examiner.*